March 13, 1956 C. D. IHRIG 2,738,416
LIGHT-OUT PROTECTION IN A THREE-BLOCK
FOUR-INDICATION SIGNALING SYSTEM
Filed Oct. 25, 1951 6 Sheets-Sheet 1

*Note:-*
*Each of the Relays 2FR, 3FR, 4FR, and 5FR, when energized, closes and opens its front and back contacts on the order of forty times per minute.*

INVENTOR.
Clifford D. Ihrig
BY W. L. Stout.
HIS ATTORNEY

INVENTOR.
Clifford D. Ihrig
BY
W. L. Stout.
HIS ATTORNEY

INVENTOR.
Clifford D. Ihrig
BY
W. L. Stout.
HIS ATTORNEY

INVENTOR.
Clifford D. Ihrig
BY
W. L. Stout.
HIS ATTORNEY

INVENTOR.
Clifford D. Ihrig
BY W. L. Stout
HIS ATTORNEY

March 13, 1956 C. D. IHRIG 2,738,416

LIGHT-OUT PROTECTION IN A THREE-BLOCK FOUR-INDICATION SIGNALING SYSTEM

Filed Oct. 25, 1951 6 Sheets-Sheet 6

INVENTOR.
Clifford D. Ihrig
BY
W. L. Stout.
HIS ATTORNEY

United States Patent Office 2,738,416
Patented Mar. 13, 1956

2,738,416

LIGHT-OUT PROTECTION IN A THREE-BLOCK FOUR-INDICATION SIGNALING SYSTEM

Clifford D. Ihrig, Penn Township, Allegheny County, Pa., assignor to Westinghouse Air Brake Company, Wilmerding, Pa., a corporation of Pennsylvania Application October 25, 1951, Serial No. 253,113

9 Claims. (Cl. 246—46)

My invention relates to a railway signal control system. More particularly, my invention relates to a lightout protection scheme for a railway signaling system which embodies light signals such, for example, as signals of the well-known color light type.

An object of my invention is the provision of a novel and improved lightout protection arrangement for a railway signaling system in which each signal at times displays a flashing light aspect.

A feature of my invention for accomplishing this object is the provision of a novel and improved arrangement such that if a green lamp of a signal burns out, a flashing yellow light aspect of the same signal will be provided.

Another feature of my invention for accomplishing the object stated is the provision of control means such that if the yellow lamp of a signal burns out, the next signal in the rear will display a steady yellow light aspect. If, however, traffic conditions are suitable for a signal to display the green light aspect, whereas the yellow lamp of the same signal is burned out, the aspect of the next signal in the rear will not be changed to the steady yellow light.

Still another feature of my invention for accomplishing the object stated is the provision of control means for checking the operation of a flasher relay which controls a flashing light aspect of a signal, so that if the flasher relay does not operate properly, the same signal will be controlled to display a steady yellow light aspect and the next signal in the rear will be controlled to display a flashing yellow light aspect.

I shall describe three forms of apparatus embodying my invention, and shall then point out the novel features thereof in claims.

In the accompanying drawings, Figs. 1*a*, 1*b*, 1*c* and 1*d*, when placed side by side, in the order named, with Fig. 1*a* on the left, constitute a diagrammatic view showing one form of apparatus embodying my invention, in which each signal is of the color light type, capable of displaying steady green, flashing yellow, steady yellow and steady red light aspects in a three-block four-indication signaling system; in which two lightout relays are provided for each signal, one for the green lamp and the other for the yellow lamp of the signal, each lightout relay having a high resistance winding and a low resistance winding; in which each signal is normally not lighted, but is controlled to become lighted in response to a train approaching within a predetermined distance in the rear of the corresponding signal in the direction for which the signal governs traffic movements.

Similar reference characters refer to similar parts in each of the views.

Figure 1A:
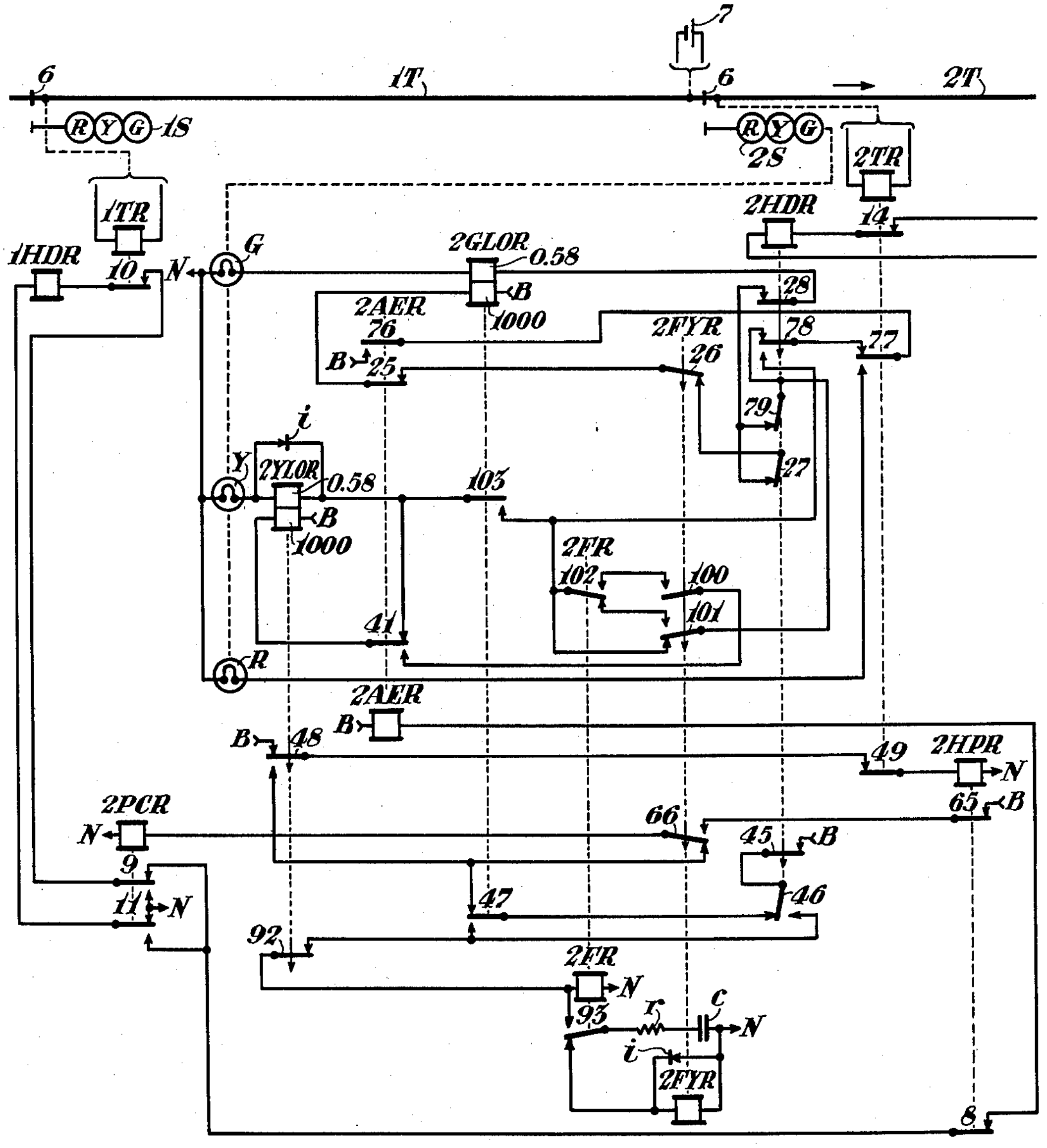
Figure 1A:
Figure 1B:
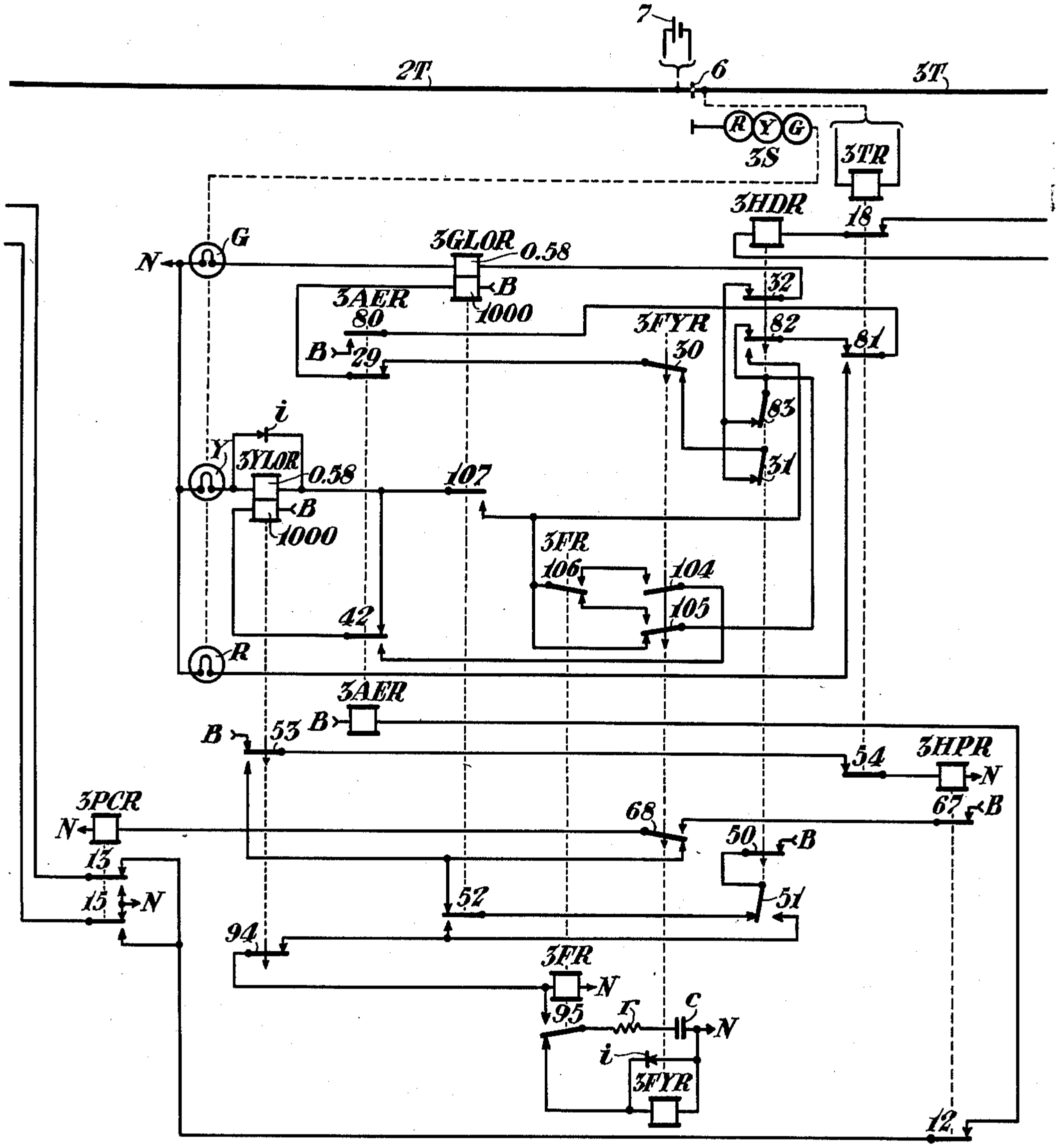
Figure 1C:
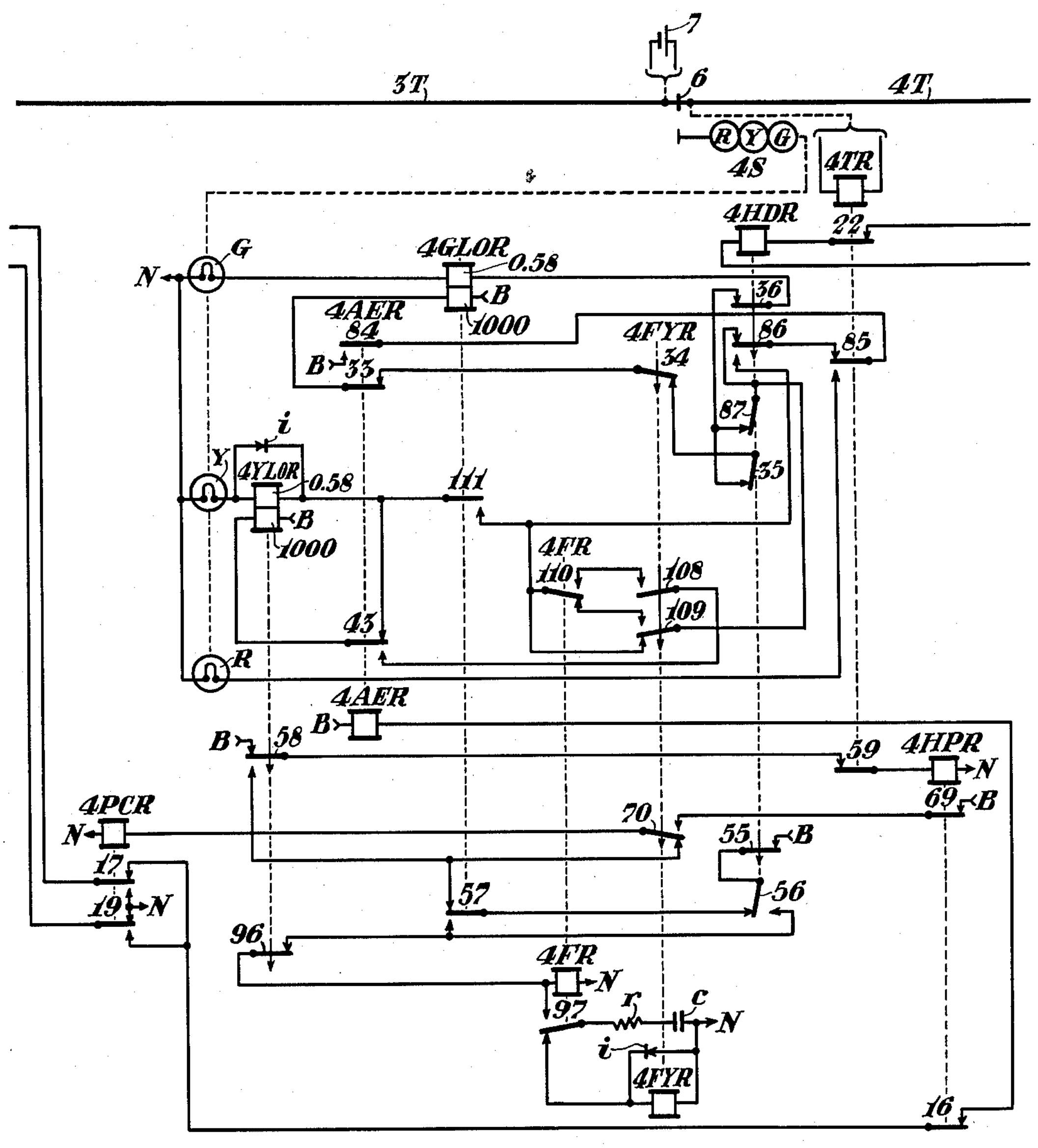
Figure 1D:
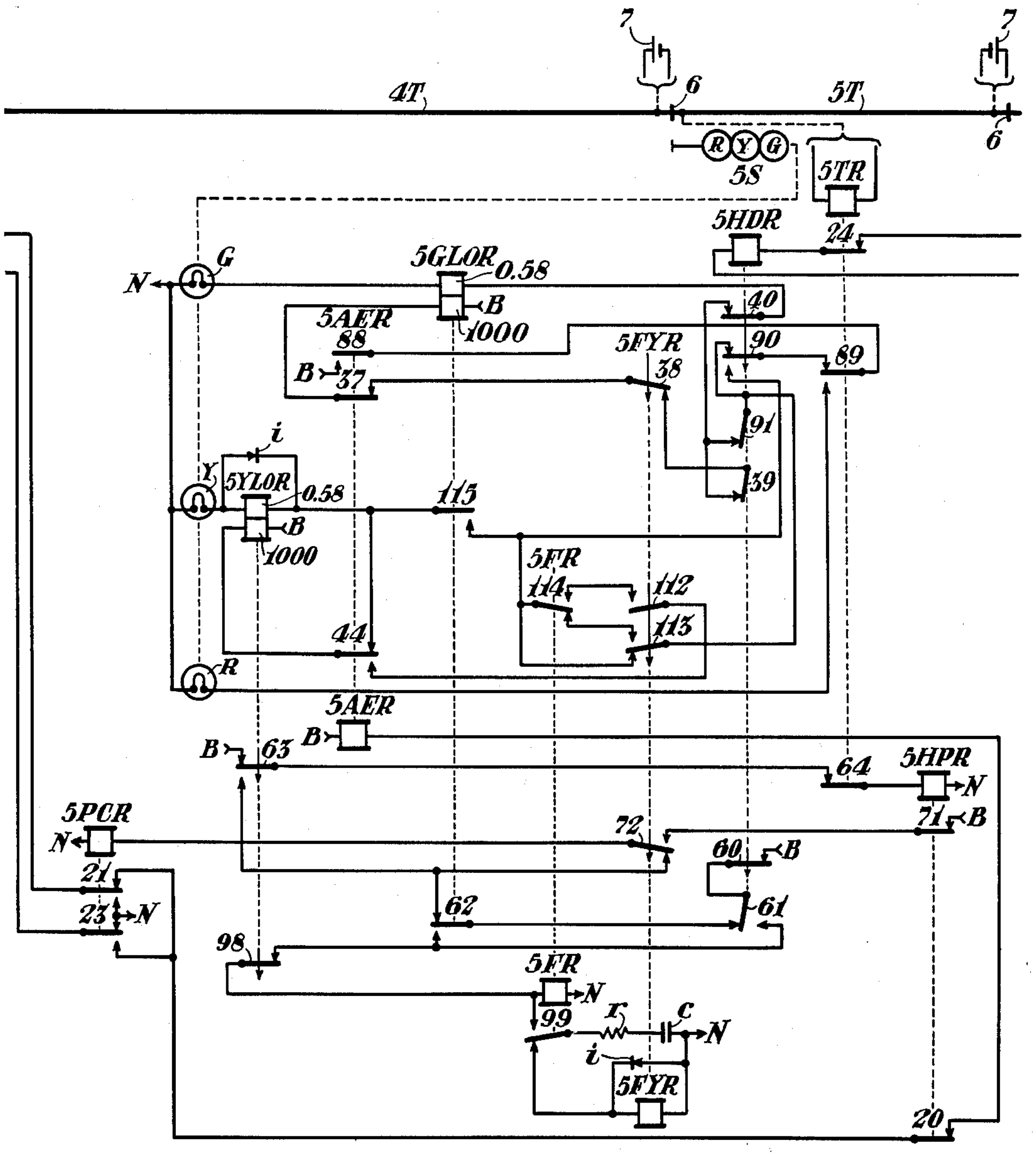

Referring further to Figs. 1*a*, 1*b*, 1*c* and 1*d* of the drawings, a stretch of railway track is shown, over which traffic movements are normally made in the direction indicated by the arrow. In order to simplify the drawings, each track, comprising two parallel series of track rails, is represented by a single line.

The stretch of track is divided by insulated joints 6 into sections designated by the reference characters 1T, 2T, 3T, 4T and 5T. Each of these sections is provided with a track circuit including a suitable source of current, such, for example, as a battery 7 connected across the rails adjacent one end of the section, and a track relay, designated by the reference character R preceded by the reference character for the corresponding section, connected across the rails at the opposite end of the section.

Signals, designated by the reference characters 1S, 2S, 3S, 4S and 5S, are located adjacent the entrance end of sections 1T, 2T, 3T, 4T and 5T, respectively, for governing traffic movements in the direction indicated by the arrow, toward the right, as shown in the drawings, which I shall assume is the eastbound direction. The length of track between each of the signals and the next signal in advance is known as a block, and therefore each of the sections 1T, 2T, 3T, 4T and 5T constitutes a block. Each of the signals, as shown in the drawings, is of the well-known color light type having green, yellow and red lamps, designated by the reference characters G, Y and R, respectively. Each of the signals is controlled to display three different proceed indications, as well as a stop indication, in a three-block four-indication signaling system, as shown by the following tabulation:

| Name of Signal Indication | Signal Indication | Signal Aspect |
|---|---|---|
| Clear | Proceed | Steady green light. |
| Advance approach | Proceed, preparing to stop at second signal in advance. | Flashing yellow light. |
| Approach | Proceed, preparing to stop at next signal. | Steady yellow light. |
| Stop | Stop | Steady red light. |

Two lightout relays are provided for each signal. The lightout relays for each signal are designated by the reference characters GLOR and YLOR, each preceded by the numeral in the reference character for the corresponding signal. Each of the lightout relays is provided with two control windings, one of which I shall call the first winding, designated by the reference character 1000, having a high resistance which may be of the order of 1000 ohms, and the other of which I shall call the second winding, designated by the reference character 0.58, having a low resistance which may be of the order of 0.58 ohm. The windings of each GLOR relay are at times connected in series with the green lamp of the corresponding signal, and the windings of each YLOR relay are at times connected in series with the yellow lamp of the corresponding signal. The relation between the resistances of the windings of the lightout relays and the resistances of the signal lamps is such that, when a high resistance winding of a lightout relay is connected in series with a signal lamp, the lamp will remain dark, whereas, when a low resistance winding is connected in series with a signal lamp, the lamp will become lighted. Each relay YLOR is made slow releasing by an asymmetric unit, designated by the reference character *i*, connected across its low resistance winding, with the high resistance direction of the asymmetric unit opposite to the direction of flow of energizing current through the low resistance winding of the YLOR relay. The asymmetric unit *i* may be of the well-known half-wave copper oxide rectifier type.

The lighting of the lamps of each of the signals is controlled by the track relay for the block of the signal, that is, the first block in advance of the signal, and by a distant control relay designated by the reference character HDR preceded by the numeral in the reference character for the corresponding signal, and by an approach control relay designated by the reference character AER preceded by the numeral in the reference character for the corresponding signal, and also by a flasher control relay and a flasher checking relay designated by the reference characters FR and FYR, respectively, each preceded by the numeral in the reference character for the corresponding signal.

Each distant control relay HDR is controlled by a front contact of the track relay for the first block in advance of the corresponding signal, and by pole-changing contacts of a pole-changer relay for the next signal in advance, designated by the reference character PCR preceded by the numeral in the reference character for the next signal in advance, and also by a front contact of a home control repeater relay for the next block in advance of the corresponding signal, designated by the reference character HPR preceded by the numeral in the reference character for the next signal in advance. Each relay HDR is of the retained neutral type, that is, its front neutral contacts remain closed during a reversal of polarity of energizing current supplied to its control winding and during the consequent operation of its polar contacts from one extreme position to the other.

The approach control relay AER for each signal is connected in series with the HDR relay for the next signal in the rear of the corresponding signal.

Each home control repeater relay HPR is controlled by the track relay for the first block in advance of the corresponding signal and by the YLOR and GLOR relays and the HDR relay for the corresponding signal.

Each flasher control relay FR is controlled by the HDR relay and by the GLOR and YLOR relays for the corresponding signal. Each relay FR is of a type which, while it is energized, will repeatedly close and open its front and back neutral contacts alternately at a frequency which may be on the order of 40 times per minute.

An energy storing device, shown as a capacitor designated by the reference character *c*, for each flasher relay FR, is controlled by a front contact of the associated relay FR, so that the capacitor *c* becomes charged during the periods when the front contacts of the associated relay FR are closed.

The flasher checking relay FYR for the same signal is controlled by a back contact of the FR relay to be energized by current discharged from the associated capacitor c each time the back contacts of the FR relay become closed. The flasher checking relay FYR is made slow releasing, by an asymmetric unit, which may be of the well-known half-wave copper oxide rectifier type, designated by the reference character *i*, connected across the control winding of relay FYR so that the high resistance direction of the asymmetric unit is opposite to the polarity of the current supplied to the winding of relay FYR. It follows that each relay FYR will retain its front contacts closed only if the corresponding flasher control relay FR is repeatedly closing and opening its front and back contacts. Each flasher checking relay FYR therefore checks the operation of the corresponding flasher control relay FR.

Each pole-changer relay PCR is controlled by the flasher checking relay FYR and by the home control repeater relay HPR for the corresponding signal, and also by the lightout relay GLOR and the distant control relay HDR for the corresponding signal.

The control circuits and lamps may be supplied with energizing current from any suitable source such, for example, as a battery shown in Fig. 1*a*, designated by the reference character Q, and having terminals B and N.

Figure 2:
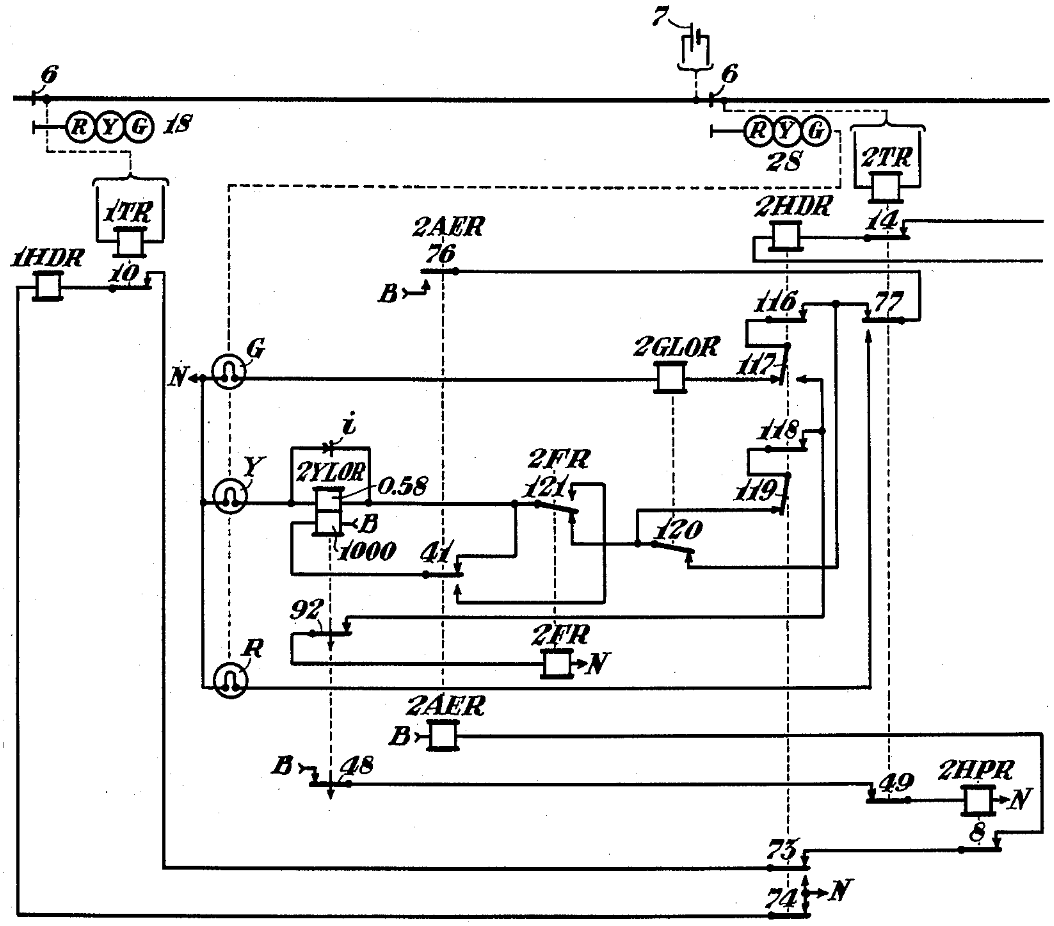
Fig. 2 is a diagrammatic view showing a modified form of the apparatus of Figs. 1*a*, 1*b*, 1*c* and 1*d*, also embodying my invention, in which a lightout relay having a high resistance winding and a low resistance winding is provided for only the yellow lamp of each signal, and a lightout relay having only a low resistance winding is provided for the green lamp of the same signal.

In the modified form of apparatus shown in Fig. 2, the flasher checking relay FYR and the pole-changer relay PCR for each signal are omitted, and the GLOR relay has only a low resistance winding. In this form, relay HDR for each signal is controlled by pole-changing contacts of the relay HDR for the next signal in advance instead of by the PCR relay for the next signal in advance.

Figure 3:
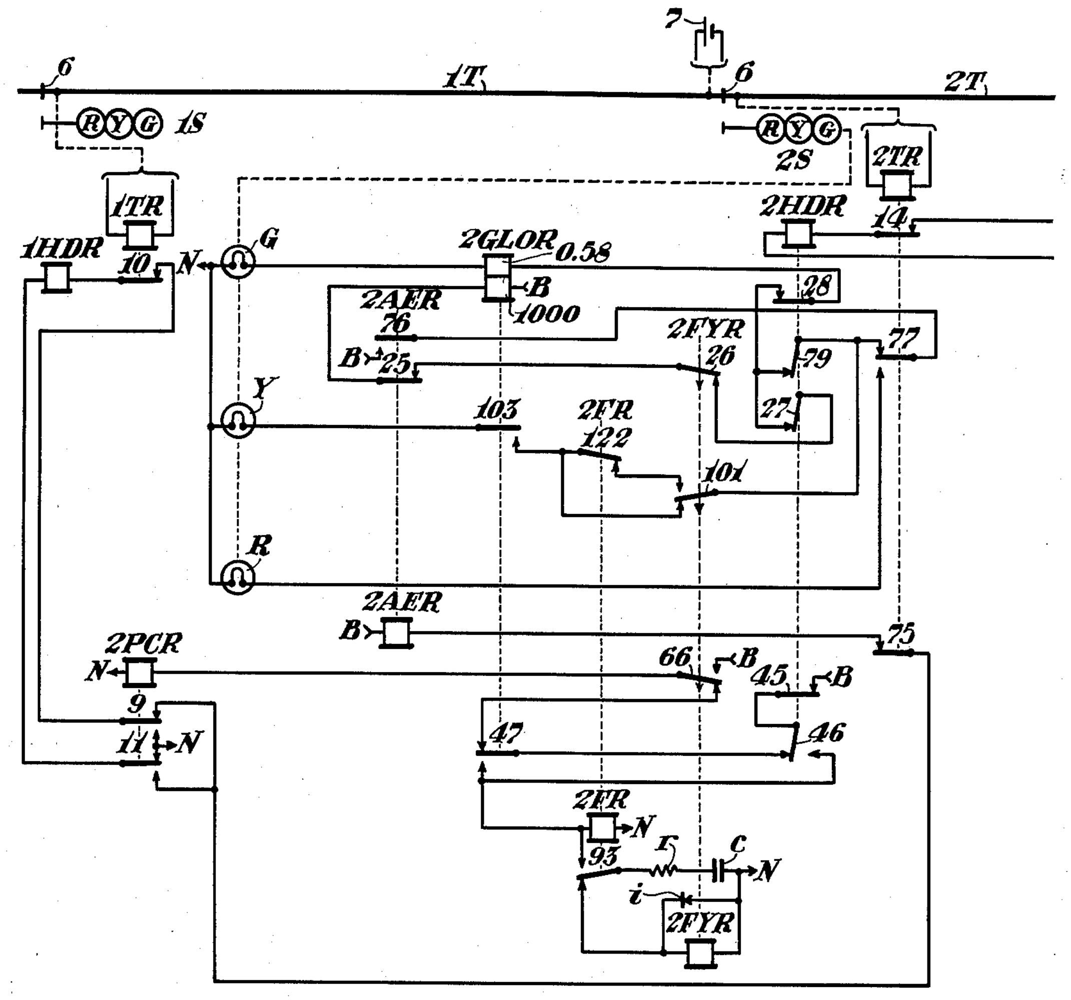
Fig. 3 is a diagrammatic view showing another modified form of the apparatus of Figs. 1*a*, 1*b*, 1*c* and 1*d*, also embodying my invention, in which a lightout relay is provided for only the green lamp of each signal.

In the modified form of apparatus shown in Fig. 3, the home control repeater relay HPR and the lightout relay YLOR for each signal are omitted.

Having described, in general, the arrangement and control of the various parts of apparatus embodying my invention, I shall now describe the circuits and operation in detail.

As shown in the drawings, all parts of the apparatus are in the normal condition, that is, the stretch of track is unoccupied, and therefore the track relays are all energized; relays 1HDR, 2HDR, 3HDR, 4HDR and 5HDR are energized by current of normal polarity; both the high and the low resistance windings of each of the lightout relays 2GLOR, 3GLOR, 4GLOR and 5GLOR for signals 2S, 3S, 4S and 5S, respectively, are connected in a circuit in series with the lamp G of the corresponding signal so that the GLOR relays are all energized but the lamps G are not lighted; the high and the low resistance windings of the lightout relays 2YLOR, 3YLOR, 4YLOR and 5YLOR for signals 2S, 3S, 4S and 5S, respectively, are connected in a circuit in series with the lamp Y of the corresponding signal, so that the YLOR relays are energized but the lamps Y are not lighted; relays 2AER, 3AER, 4AER, 5AER, 2HPR, 3HPR, 4HPR, 5HPR, 2PCR, 3PCR, 4PCR, and 5PCR are energized; relays 2FR, 3FR, 4FR, 5FR, 2FYR, 3FYR, 4FYR, 5FYR, and the lamps R of the signals are deenergized; and therefore each of the signals 2S, 3S, 4S and 5S is dark.

In Fig. 1*a*, the circuit by which relay 1HDR is energized by current of normal polarity passes from terminal B, through the winding of relay 2AER, contact 8 of relay 2HPR, front point of contact 9 of relay 2PCR, contact 10 of relay 1TR, winding of relay 1HDR, and the front point of contact 11 of relay 2PCR to terminal N. Each of the relays 2HDR, 3HDR and 4HDR is energized by current of normal polarity in a circuit which is similar to the circuit just traced for relay 1HDR. Relay 5HDR is also energized by current of normal polarity in a similar circuit, only a portion of which is shown, including contact 24 of relay 5TR.

Relay AER for each of the signals is connected in series with the relay HDR for the next signal in the rear. The relays AER are therefore also energized by the circuits described for the HDR relays.

The circuit by which relay 2GLOR is energized passes from terminal B, through the high resistance winding of relay 2GLOR, contact 25 of relay 2AER, contact 26 of relay 2FYR, contacts 27 and 28 of relay 2HDR, low resistance winding of relay 2GLOR, and lamp G of signal 2S to terminal N. Since lamp G, in this circuit, is included in series with the high resistance winding of relay 2GLOR, lamp G remains dark. Each of the relays 3GLOR, 4GLOR and 5GLOR is energized by a circuit which is similar to the circuit just traced for relay 2GLOR, and therefore the lamp G for each of the signals 3S, 4S and 5S is also dark.

The circuit by which relay 2YLOR is energized passes from terminal B, through the high resistance winding of relay 2YLOR, front point of contact 41 of relay 2AER, low resistance winding of relay 2YLOR in multiple with an asymmetric unit *i*, and lamp Y of signal 2S to terminal N. Each of the relays 3YLOR, 4YLOR and 5YLOR is energized by a circuit which is similar to the circuit just traced for relay 2YLOR. In these circuits, the high resistance winding of each YLOR relay is connected in series with the lamp Y for the corresponding signal, and therefore the lamps Y are also dark.

A first circuit, by which relay 2HPR is energized as shown, passes from terminal B, through the front point of contact 48 of relay 2YLOR, contact 49 of relay 2TR, and the winding of relay 2HPR to terminal N. Relay 2HPR is at times energized over a second circuit, extending from terminal B, over the neutral front point of contact 45 and the normal point of polar contact 46 of relay 2HDR, the front point of contact 47 of relay 2GLOR, the back point of contact 48 of relay 2YLOR, the front point of contact 49 of relay 2TR, and through the winding of relay 2HPR to terminal N. Relays 3HPR, 4HPR and 5HPR are energized by circuits which are similar to the circuit just traced for relay 2HPR.

Relay 2PCR is energized by a circuit passing from terminal B, through contact 45 of relay 2HDR, contact 46 of relay 2HDR closed in the normal position, front point of contact 47 of relay 2GLOR, back point of contact 66 of relay 2FYR, and the winding of relay 2PCR to terminal N. Relays 3PCR, 4PCR and 5PCR are energized by circuits which are similar to the circuit just traced for relay 2PCR.

As shown in Fig. 2, relay 1HDR is energized by a circuit which is similar to the circuit traced in Fig. 1*a* except that the circuit for relay 1HDR shown in Fig. 2 includes pole-changing contacts 73 and 74 of relay 2HDR instead of the pole-changing contacts 9 and 11 of relay 2PCR shown in Fig. 1*a*.

In Fig. 3, the control circuit shown for relay 1HDR is similar to that which is shown in Fig. 1*a* except that it includes contact 75 of relay 2TR instead of contact 8 of relay 2HPR shown in Fig. 1*a*.

I shall assume that, with apparatus embodying my invention as shown in Figs. 1*a*, 1*b*, 1*c* and 1*d*, an eastbound train approaches signal 1S, causing signal 1S to display a steady green light aspect in the same way as will be described for signal 2S when the train enters section 1T. The train, upon entering section 1T, will control signal 1S to display the steady red light aspect as will also be described for signal 2S when the train enters section 2T.

When the train enters section 1T, deenergizing relay 1TR, the circuit previously traced for relays 1HDR and 2AER will be opened at contact 10 of relay 1TR, causing relays 1HDR and 2AER to be deenergized. With relay 2AER deenergized, a circuit will be completed which includes only the low resistance winding of relay 2GLOR in series with lamp G of signal 2S. This circuit passes from terminal B, through contact 76 of relay 2AER, front point of contact 77 of relay 2TR, front point of contact 78 of relay 2HDR, contacts 79 and 28 of relay 2HDR, low resistance winding of relay 2GLOR, and lamp G of signal 2S to terminal N. With only the low resistance winding of relay 2GLOR included in series with lamp G of signal 2S, lamp G will become lighted, and therefore signal 2S will display a steady green light aspect. Relay 2GLOR, on account of its low resistance winding still being energized, will retain its contacts in the energized position.

With relay 2AER deenergized, the circuit previously traced for relay 2YLOR will be open at the front point of contact 41 of relay 2AER, causing relay 2YLOR to be deenergized. The first circuit previously traced for relay 2HPR will therefore in turn be opened at the front point of contact 48 of relay 2YLOR, but relay 2HPR will continue to be held up over its second circuit, previously described.

When the eastbound train enters section 2T, deenergizing relay 2TR, relays 2HDR and 3AER will become deenergized because of the opening of contact 14 of relay 2TR. Contact 28 of relay 2HDR will therefore open the circuit traced for the low resistance winding of relay 2GLOR, causing lamp G of signal 2S to be extinguished and relay 2GLOR to be deenergized. With relay 2TR deenergized, a circuit will be completed for lighting the red lamp R of signal 2S, this circuit passing from terminal B, through contact 76 of relay TAER, back point of contact 77 of relay 2TR, and lamp R of signal 2S to terminal N.

The second circuit traced for relay 2HPR will now be opened at contact 49 of relay 2TR. It follows that relay 2HPR will be deenergized as long as the train occupies section 2T, so that its contact 8 will be open in the circuit traced for relay 2AER. Therefore, the red light aspect of signal 2S will be displayed as long as the train remains on section 2T.

With relay 3AER deenergized, lamp G of signal 3S will be lighted as previously described for lamp G of signal 2S when the train entered section 1T. Relay 3YLOR will be deenergized by the opening of contact 42 of relay 3AER at its front point, and the first circuit for relay 3HPR will be opened at contact 53 of relay 3YLOR, but relay 3HPR will continue to be held up over a circuit including terminal B, the front point of neutral contact 50 and the normal point of polar contact 51 of relay 3HDR, the front point of contact 52 of relay 3GLOR, the back point of contact 53 of relay 3YLOR, and the front point of contact 54 of relay 3TR.

When the train enters section 3T, relay 3TR will become deenergized, causing relays 3HDR, 3HPR and 4AER to also in turn become deenergized. Lamp G of signal 3S will therefore be extinguished, and relay 3GLOR will be deenergized, and lamp R of signal 3S will be lighted.

With relay 4AER deenergized, lamp G of signal 4S will be lighted.

When the train leaves section 2T, relay 2TR will become energized and extinguish red lamp R of signal 2S. While the train is on section 3T, relay 3TR will be deenergized, and therefore its contact 54 will be open in the circuit for relay 3HPR, and contact 12 of relay 3HPR will in turn be open in the circuit for relay 2HDR, so that relay 2HDR will remain deenergized while the train occupies section 3T after leaving section 2T. With relay 2HDR deenergized, its contact 28 will be open, and therefore relay 2GLOR will remain deenergized and lamp G of signal 2S will remain extinguished.

The low resistance winding of relay 2YLOR will now be energized for a brief period by a circuit passing from terminal B, through contact 76 of relay 2AER, front point of contact 77 of relay 2TR, back point of contact 78 of relay 2HDR, contact 103 of relay 2GLOR, low resistance winding of relay 2YLOR in multiple with an asymmetric unit *i*, and lamp Y of signal 2S to terminal N. Relay 2YLOR, upon becoming energized, completes the first circuit previously traced for relay 2HPR, causing relay 2HPR to become energized.

With relay 2HDR deenergized, the circuit previously traced for relay 2PCR will remain open at contact 45 of relay 2HDR, so that relay 2PCR will remain deenergized.

With relay 2HPR energized, relay 2AER will now become energized in series with relay 1HDR by a circuit which is the same as the circuit previously traced for these relays except that it includes the back points of contacts 9 and 11 of relay 2PCR instead of the front points of these contacts. Relay 1HDR will therefore now be energized by current of reverse polarity.

Relay 2AER, upon becoming energized, will open its contact 76, thereby interrupting the circuit previously traced through the low resistance winding of relay 2YLOR and lamp Y of signal 2S. Relay 2YLOR will, however, now become energized by its circuit previously traced through the front point of contact 41 of relay 2AER, and which includes the high resistance winding as well as the low resistance winding of relay 2YLOR.

Lamp Y of signal 2S will therefore now be dark, although relays 2HDR and 2TR are in condition for controlling lamp Y of signal 2S to be lighted.

When the train enters section 4T, relays 4HDR and 5AER will become deenergized because of the opening of contact 22 of relay 4TR. Lamp G of signal 4S will now be extinguished, relay 4GLOR will be deenergized, lamp R of signal 4S will be lighted, and relay 4HPR will be deenergized, similarly to the operation of corresponding apparatus previously described for signal 2S when the train entered section 2T.

With relay 5AER deenergized, lamp G of signal 5S will be lighted.

When the train leaves section 3T, lamp R of signal 3S will be extinguished by the opening of contact 81 of relay 3TR at its back point. Relay 3HDR will still be deenergized while the train remains on section 4T, because relay 4HPR is deenergized on account of contact 59 of relay 4TR being open. Relay 3GLOR will still be deenergized because relay 3HDR is deenergized. Relays 3YLOR and 3HPR will now become energized, similarly to the way in which relays 2YLOR and 2HPR became energized when the train left section 2T, as previously described. With relay 3HPR energized, relays 3AER and 2HDR will become energized similarly to the corresponding relays 2AER and 1HDR when the train left section 2T. Lamp Y of signal 3S will be dark, on account of being connected in series with the high resistance winding of relay 3YLOR. On account of relay 2HDR being energized by current of reverse polarity, its contacts 27 and 79 will be open, and therefore relay 2GLOR will remain deenergized.

When the train enters section 5T, deenergizing relay 5HDR, lamp G of signal 5S will be extinguished, relay 5GLOR will become deenergized, lamp R of signal 5S will be lighted, and relay 5HPR will be deenergized, similarly to the corresponding parts of the apparatus at signal 2S when the train entered section 2T.

When the train leaves section 4T, relay 4TR will open its contact 85 at the back point, thereby extinguishing lamp R of signal 4S. Relay 4HDR will, however, remain deenergized while the train is on section 5T, on account of being controlled by relay 5HPR which is in turn controlled by contact 64 of relay 5TR. Relay 4GLOR will now still remain deenergized because relay 4HDR is deenergized. The high resistance winding of relay 4YLOR will now become connected in series with lamp Y of signal 4S, so that the yellow lamp Y of signal 4S will be dark.

Relay 4HPR will now be energized, and therefore relays 4AER and 3HDR will be energized by a circuit which supplies current of reverse polarity to relay 3HDR. Relay 3GLOR will therefore still remain deenergized.

With relay 3HDR energized by current of reverse polarity, and with relay 3YLOR energized, relay 3FR will now be energized by a circuit passing from terminal B, through contact 50 of relay 3HDR, contact 51 of relay 3HDR closed in the reverse position, contact 94 of relay 3YLOR, and the winding of relay 3FR to terminal N. Relay 3FR will therefore repeatedly close and open its contact 95 at the front and back points at a frequency which may be of the order of 40 times per minute.

During the periods when contact 95 of relay 3FR is closed at its front point, capacitor *c*, shown adjacent relay 3FR, will become charged by a circuit which is the same as the circuit described for relay 3FR through contact 94 of relay 3YLOR, and then passing through the front point of contact 95 of relay 3FR, and through resistor *r*, and capacitor *c* to terminal N. During the periods when contact 95 of relay 3FR is closed at its back point, capacitor *c* will become discharged by a circuit passing from capacitor *c*, through resistor *r*, back point of contact 95 of relay 3FR, and the winding of relay 3FYR in multiple with an asymmetric unit *i*, back to capacitor *c*. Relay 3FYR will therefore become energized, and, on account of being made slow releasing by asymmetric unit *i*, will retain its contacts in the energized condition during the periods when contact 95 of relay 3FR is open at the back point.

With relays 3HPR and 3FYR now energized, relay 3PCR will be energized by a second circuit, passing from terminal B, through contact 67 of relay 3HPR, front point of contact 68 of relay 3FYR, and the winding of relay 3PCR to terminal N. With relay 3PCR again energized, relay 2HDR will again be energized by current of normal polarity by the circuit previously described for this relay.

I shall next assume that, while the train is still on section 5T, a second eastbound train enters section 1T. With relay 2HDR now energized by current of normal polarity, lamp G of signal 2S will become lighted to display a steady green light aspect, as previously described.

I shall assume further that the second train now enters section 2T while the first train is still on section 5T. Relays 3AER and 2HDR will become deenergized as previously described.

With relays 3FR and 3FYR energized, a circuit will be closed, while the contacts of relay 3FR are closed at their back points, to light lamp Y of signal 3S, this circuit passing from terminal B, through contact 80 of relay 3AER, front points of contacts 81 and 82 of relays 3TR and 3HDR, respectively, front point of contact 105 of relay 3FYR, back point of contact 106 of relay 3FR, contact 107 of relay 3GLOR, low resistance winding of relay 3YLOR in multiple with an asymmetric unit *i*, and lamp Y of signal 3S to terminal N. During the periods when the front points of the contacts of relay 3FR are closed, the high resistance winding of relay 3YLOR will be included in series with lamp Y of signal 3S in a circuit passing from terminal B, through the high resistance winding of relay 3YLOR, back point of contact 42 of relay 3AER, contact 104 of relay 3FYR, front point of contact 106 of relay 3FR, contact 107 of relay 3GLOR, low resistance winding of relay 3YLOR in multiple with asymmetric unit *i*, and lamp Y of signal 3S to terminal N. On account of being included in series with the high resistance winding of relay 3YLOR, lamp Y will be extinguished during the periods when the front points of the contacts of relay 3FR are closed. It follows that signal 3S will now display a flashing yellow light aspect.

Since both windings of relay 3YLOR will be energized while the front points of the contacts of relay 3FR are closed, and the low resistance winding of relay 3YLOR will be energized while the back points of the contacts of relay 3FR are closed, and since relay 3YLOR is made slow releasing by the asymmetric unit *i* connected in multiple with the low resistance winding, the contacts of relay 3YLOR will remain in the energized position while lamp Y of signal 3S is displaying a flashing light aspect.

If the second train now enters section 3T while the first train is still on section 5T, relay 4AER will be deenergized as previously described. With relay 4TR energized, and relays 4HDR and 4GLOR deenergized, lamp Y of signal 4S will be steadily lighted by a circuit passing from terminal B, through contact 84 of relay 4AER, front point of contact 85 of relay 4TR, back point of contact 86 of relay 4HDR, contact 111 of relay 4GLOR, low resistance winding of relay 4YLOR in multiple with an asymmetric unit *i*, and lamp Y of signal 4S to terminal N. Signal 4S will therefore now display a steady yellow light aspect.

I shall assume that all parts of the apparatus are returned to their normal condition, and that, again, an eastbound train occupies section 5T.

I shall assume further that the flasher relay 3FR has failed to operate, so that relay 3FYR has not become energized when the train left section 4T and relay 3HDR become energized by current of reverse polarity while relay 3YLOR was energized. With relay 3FYR deenergized, relay 3PCR cannot be energized by its second circuit, traced through contacts 67 and 68 of relays 3HPR and 3FYR, respectively, and with relay 3HDR now energized by current of reverse polarity, relay 3PCR will not become energized by the first circuit described for this relay, through contact 51 of relay 3HDR in the normal position. Relay 3PCR will therefore be deenergized, and relay 2HDR will be energized by current of reverse polarity.

With relay 2HDR energized by current of reverse polarity, relay 2GLOR will remain deenergized.

With relay 2HDR energized by current of reverse polarity while relay 2YLOR is energized, relay 2FR will become energized by a circuit passing from terminal B, through contact 45 of relay 2HDR, contact 46 of relay 2HDR closed in the reverse position, contact 92 of relay 2YLOR, and the winding of relay 2FR to terminal N. With relay 2FR thus energized, relay 2FYR will also be energized, similarly to the manner of energization of relay 3FYR in response to energization of relay 3FR, as already described.

With relay 2FYR energized while relay 2HPR is energized, relay 2PCR will be energized by a circuit passing from terminal B, through contact 65 of relay 2HPR, front point of contact 66 of relay 2FYR, and the winding of relay 2PCR to terminal N. With relay 2PCR energized, relay 1HDR will be energized by current of normal polarity.

If, now, a second eastbound train approaches block 1T, signal 1S will again be controlled to display a steady green light aspect.

When the second eastbound train enters section 1T, signal 2S will be controlled to display the flashing yellow light aspect, on account of relays 2FR and 2FYR being energized, similarly to the manner of control of signal 3S to display a flashing yellow light aspect, as previously described.

With the flasher control relay 3FR failing to operate when it should be operated, lamp Y of signal 3S will become energized to display a steady yellow light aspect, when the train enters section 2T, by a circuit passing from terminal B, through contact 80 of relay 3AER, front points of contacts 81 and 82 of relays 3TR and 3HDR, respectively, back point of contact 105 of relay 3FYR, contact 107 of relay 3GLOR, low resistance winding of relay 3YLOR in multiple with asymmetric unit *i*, and lamp Y of signal 3S to terminal N.

It follows that, with a flasher control relay such, for example, as relay 3FR, failing to operate when it should be operating, the corresponding signal 3S will be controlled to display a steady yellow light aspect.

If signal 3S were displaying a flashing yellow light aspect, signal 2S would be controlled to display a steady green light aspect, as previously described. In apparatus embodying my invention, however, signal 2S will be controlled to display the next most restrictive aspect, that is, the flashing yellow light aspect, if signal 3S is controlled to display a steady yellow light aspect because of failure of the flasher control relay 3FR when signal 3S is being controlled by relays 3HDR and 3TR to normally display a flashing yellow light aspect.

I shall now assume that all parts of the apparatus are again in the normal condition, with blocks 2T, 3T, 4T and 5T unoccupied. Relay 3HDR will therefore be energized by current of normal polarity, and the apparatus at signal 3S will be in condition for controlling signal 3S to display a steady green light aspect when an eastbound train enters section 2T.

I shall assume further that lamp Y of signal 3S has burned out, so that relay 3YLOR is deenergized. The first circuit previously described for energizing relay 3HPR through the front point of contact 53 of relay 3YLOR will therefore now be open, but relay 3HPR will be energized by its second circuit, passing from terminal B, through contact 50 of relay 3HDR, contact 51 of relay 3HDR closed in the normal position, front point of contact 52 of relay 3GLOR, back point of contact 53 of relay 3YLOR, contact 54 of relay 3TR, and the winding of relay 3HPR to terminal N.

Relay 3PCR will now be energized by its circuit first described. Relay 2HDR will therefore still be energized by current of normal polarity.

If, therefore, an eastbound train now enters section 1T, signal 2S will display a steady green light aspect, and, when the train enters section 2T, signal 3S will display a steady green light aspect, while lamp Y of signal 3S is burned out.

I shall assume that all parts of the apparatus are again in the normal condition, so that the apparatus at signal 3S is in condition to control signal 3S to display a steady green light aspect. I shall assume, however, that lamp G of signal 3S has burned out, so that relay 3GLOR is deenergized. With relay 3GLOR deenergized, relay 3FR will now be energized by a second circuit, which includes contact 50 of relay 3HDR, contact 51 of relay 3HDR closed in the normal position, back point of contact 52 of relay 3GLOR, and contact 94 of relay 3YLOR. Relay 3FYR will therefore also be energized. Relay 3PCR will now be energized by its circuit which includes contact 67 of relay 3HPR and the front point of contact 68 of relay 3FYR, so that relay 2HDR will be energized by current of normal polarity.

If, therefore, an eastbound train now enters section 1T, signal 2S will display the steady green light aspect. When the train enters section 2T, relay 3YLOR and lamp Y of signal 3S will be energized alternately by the circuit, previously traced, which includes only the low resistance winding of relay 3YLOR, and by the circuit also previously traced, which includes also the high resistance winding of relay 3YLOR, so that lamp Y will be periodically lighted for displaying the flashing yellow light aspect.

I shall next assume that all parts of the apparatus are again in the normal condition, and that an eastbound train moves over blocks 1T, 2T, 3T and 4T and occupies block 5T, after leaving block 4T. Relay 3HDR will therefore be energized by current of reverse polarity, relay 3GLOR will be deenergized, and relays 3FR and 3FYR will be energized to control signal 3S to display a flashing yellow light aspect when a second eastbound train enters section 2T. Under normal conditions, with lamp Y of signal 3S intact, relay 3PCR would be energized, so that relay 2HDR would be energized by current of normal polarity to control signal 2S to display a steady green light aspect when the second eastbound train enters section 1T.

I shall assume, however, that lamp Y of signal 3S has burned out. Relay 3YLOR will therefore be deenergized, and the circuits for relays 3FR and 3FYR will be open at contact 94 of relay 3YLOR. With relay 3YLOR deenergized and relay 3HDR energized by current of reverse polarity, relay 3HPR will be deenergized, and therefore relay 2HDR will also be deenergized, so that relay 2GLOR will also in turn be deenergized.

With no train on section 1T, or section 2T, relay 2YLOR will be energized by the circuit, which includes both high and low resistance windings, previously traced through the front point of contact 41 of relay 2AER. Relay 2HPR will therefore be energized by its circuit previously traced through the front point of contact 48 of relay 2YLOR. With relay 2HDR deenergized, relay 2PCR will be deenergized, and therefore relay 1HDR will be energized by current of reverse polarity.

Signal 1S will therefore display a flashing yellow light aspect instead of a steady green light aspect when the second eastbound train now approaches signal 1S. When the train enters section 1T, lamp Y of signal 2S will be steadily lighted by the circuit passing from terminal B, through contact 76 of relay 2AER, front point of contact 77 of relay 2TR, back point of contact 78 of relay 2HDR, contact 103 of relay 2GLOR, low resistance winding of relay 2YLOR in multiple with an asymmetric unit *i*, and lamp Y of signal 2S to terminal N.

I shall now assume that all parts of the apparatus are again returned to the normal condition, and that again an eastbound train then occupies section 5T, after having left section 4T. Relays 4HDR and 4GLOR will therefore be deenergized, and the apparatus at signal 4S will be in condition to control signal 4S to display a steady yellow light aspect when a second eastbound train enters section 3T.

I shall assume, however, that lamp Y of signal 4S has burned out, and therefore relay 4YLOR is deenergized. Relay 4HPR will therefore also be deenergized, causing relay 3HDR to again be deenergized.

With relay 3HDR deenergized, the circuits for relays 3FR and 3FYR will be open at contact 50 of relay 3HDR, and therefore the apparatus at signal 3S will be in condition to control signal 3S to display a steady yellow light aspect instead of a flashing yellow light aspect. Relay 3YLOR will therefore be energized, and, in turn, relay 3HPR will also be energized.

On account of relays 3FYR and 3HDR being deenergized, relay 3PCR will also be deenergized, so that relay 2HDR will be energized by current of reverse polarity. The apparatus at signal 2S will therefore be in condition to control signal 2S to display a flashing yellow instead of a steady green light aspect when an eastbound train enters section 1T.

I have described, for a few typical sets of traffic conditions, the operation of the apparatus shown in Figs. 1*a*, 1*b*, 1*c* and 1*d*. It is believed that, in view of those descriptions, the operation of the apparatus shown in Figs. 1*a*, 1*b*, 1*c* and 1*d* can be readily traced for any other possible set of traffic conditions, and that the operation of the apparatus modified as shown in Figs. 2 and 3 can also be readily traced for any possible sets of traffic conditions.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In a three-block four-indication signal control arrangement for a railway signaling system in which each signal comprises a green and a yellow and also a red lamp and is controlled by traffic responsive means actuated by a train approaching it in the direction for which the signal governs traffic movements and is also controlled by traffic responsive means in advance to display an aspect comprising a steady green light or a flashing yellow light or a steady yellow light or a steady red light according as the first three blocks in advance of the signal are unoccupied or the first two blocks in advance are unoccupied while the third block is occupied or the first block in advance is unoccupied while the second block is occupied or the first block in advance of the signal is occupied respectively, the combination comprising, a flasher control relay for each signal which if energized closes and opens its front and back contacts alternately at a frequency which may be on the order of forty times per minute, means responsive to a train occupying the third block in advance of each signal while the first two blocks in advance are unoccupied for energizing the corresponding flasher control relay, a slow release flasher checking relay for each signal, means including front and back contacts of each flasher control relay for energizing the flasher checking relay for the same signal only if the flasher control relay is repeatedly closing and opening its front and back contacts, a lightout relay for the green lamp for each signal having a first winding with a high resistance and having a second winding with a low resistance, an approach control relay for each signal normally energized but becoming deenergized in response to a train occupying the first block in the rear or the first block in advance of the corresponding signal, means including a back contact or a front contact of the corresponding approach control relay and controlled by traffic responsive means for energizing the green lamp for each signal in series with only the low resistance winding or with the high resistance winding respectively of the corresponding lightout relay only if the first three blocks in advance of the corresponding signal are unoccupied, means including a back contact of the lightout control relay for each signal and controlled by traffic responsive means for energizing the flasher control relay for the same signal if the first three blocks in advance of the same signal are unoccupied, and means including a back contact of the lightout control relay for each signal and a back contact of the flasher control relay and also a front contact of the flasher checking relay for the same signal for controlling the yellow lamp of the same signal to display a flashing yellow light aspect.

2. In a three-block four-indication signal control arrangement for a railway signaling system in which each signal comprises a green and a yellow and also a red lamp and is controlled by traffic responsive means actuated by a train approaching it in the direction for which the signal governs traffic movements and is also controlled by traffic responsive means in advance to display an aspect comprising a steady green light or a flashing yellow light or a steady yellow light or a steady red light according as the first three blocks in advance of the signal are unoccupied or the first two blocks in advance are unoccupied while the third block is occupied or the first block in advance is unoccupied while the second block is occupied or the first block in advance of the signal is occupied respectively, the combination comprising, a flasher control relay for each signal which if energized closes and opens its front and back contacts alternately at a frequency which may be on the order of forty times per minute, means responsive to a train occupying the third block in advance of each signal while the first two blocks in advance are unoccupied for energizing the corresponding flasher control relay, a lightout relay for the green lamp for each signal having a first winding with a high resistance and a second winding with a low resistance, an approach control relay for each signal normally energized but becoming deenergized in response to a train occupying the first block in the rear of the corresponding signal, means including a back contact or a front contact of the corresponding approach control relay and controlled by traffic responsive means for energizing the green lamp for each signal in series with only the second winding or with the first winding respectively of the corresponding lightout relay only if the first three blocks in advance of the corresponding signal are unoccupied, means including a back contact of the lightout relay for each signal and controlled by traffic responsive means for energizing the flasher control relay for the same signal if the first three blocks in advance of the same signal are unoccupied, and means including a back contact of the lightout relay for each signal and a back contact of the flasher control relay for the same signal for controlling the yellow lamp of the same signal to display a flashing yellow light aspect.

3. In a three-block four-indication signal control arrangement for a railway signaling system in which each signal comprises a green and a yellow and also a red lamp and is controlled by traffic responsive means to display an aspect comprising a steady green light or a flashing yellow light or a steady yellow light or a steady red light according as the first three blocks in advance of the signal are unoccupied or the first two blocks in advance are unoccupied while the third block is occupied or the first block in advance is unoccupied while the second block is occupied or the first block in advance of the signal is occupied respectively, the combination comprising, a flasher control relay for each signal which if energized closes and opens its front and back contacts alternately at a frequency which may be on the order of forty times per minute, means responsive to a train occupying the third block in advance of each signal while the first two blocks in advance are unoccupied for energizing the corresponding flasher control relay, a lightout relay having a control winding for the green lamp for each signal, means including traffic responsive means for lighting the green lamp for each signal in series with the control winding of the lightout relay for the same signal only if the first three blocks in advance of the corresponding signal are unoccupied, means including a back contact of the lightout relay for each signal and controlled by traffic responsive means for energizing the flasher control relay for the same signal if the first three blocks in advance of the same signal are unoccupied, and means including a back contact of the lightout relay for each signal and a back contact of the flasher control relay for the same signal for controlling the yellow lamp for the same signal to display a flashing yellow light aspect.

4. In combination, a stretch of railway track divided into a first and a second and a third block and provided with a signal for governing traffic movements over said blocks in the order named, said signal comprising a green and a yellow and a red lamp, a flasher control relay which if energized closes and opens its front and back contacts repeatedly at a predetermined frequency, traffic responsive means for each of said three blocks, a lightout relay for said green lamp, means controlled by said traffic responsive means for lighting said green lamp in series with said lightout relay if said three blocks are unoccupied, means controlled by said traffic responsive means for energizing said flasher control relay if said first and second blocks are unoccupied while said third block is occupied, means controlled by a back contact of said lightout relay and by said traffic responsive means for energizing said flasher control relay if said green lamp is burned out and if said three blocks are unoccupied, means including a back contact of said lightout relay and a contact of said flasher control relay for periodically lighting said yellow lamp if said first and second blocks are unoccupied while said third block is occupied or if said green lamp is burned out while said three blocks are unoccupied, means controlled by said traffic responsive means for said first and second blocks for steadily lighting said yellow lamp if said first block is unoccupied while said second block is occupied, and means controlled by said traffic responsive means for said first block for lighting said red lamp if said first block is occupied.

5. In combination, a stretch of railway track divided into a first and a second and a third block and provided with a signal for governing traffic movements over said blocks in the order named, said signal comprising a green and a yellow and a red lamp, a flasher control relay which if energized closes and opens its front and back contacts repeatedly at a predetermined frequency, traffic responsive means for each of said three blocks, means controlled by said traffic responsive means for lighting said green lamp if said three blocks are unoccupied, means controlled by said traffic responsive means for energizing said flasher control relay if said first and second blocks are unoccupied while said third block is occupied, means including a contact of said flasher control relay for periodically lighting said yellow lamp if said first and second blocks are unoccupied while said third block is occupied, means controlled by said traffic responsive means for said first and second blocks for steadily lighting said yellow lamp if said first block is unoccupied while said second block is occupied, means controlled by said flasher control relay for steadily lighting said yellow lamp if said flasher control relay fails to operate when said first and second blocks are unoccupied while said third block is occupied, and means controlled by said traffic responsive means for said first block for lighting said red lamp if said first block is occupied.

6. In combination, a stretch of railway track divided into a first and a second and a third block and provided with a signal for governing traffic movements over said blocks in the order named, said signal comprising a green and a yellow and a red lamp, a flasher control relay which if energized closes and opens its front and back contacts repeatedly at a predetermined frequency, traffic responsive means for each of said three blocks, a lightout relay for said green lamp, means controlled by said traffic responsive means for lighting said green lamp in series with said lightout relay if said three blocks are unoccupied, means controlled by said traffic responsive means for energizing said flasher control relay if said first and second blocks are unoccupied while said third block is occupied, means controlled by a back contact of said lightout relay and by said traffic responsive means for energizing said flasher control relay if said green lamp is burned out while said three blocks are unoccupied, means including a back contact of said lightout relay and a contact of said flasher control relay for periodically lighting said yellow lamp if said first and second blocks are unoccupied while said third block is occupied or if said green lamp is burned out while said three blocks are unoccupied, means controlled by said traffic responsive means for said first and second blocks for steadily lighting said yellow lamp if said first block is unoccupied while said second block is occupied, means controlled by said flasher control relay for steadily lighting said yellow lamp if said flasher relay fails to operate when said green lamp burns out or when said first and second blocks are unoccupied while said third block is occupied, and means controlled by said traffic responsive means for said first block for lighting said red lamp if said first block is occupied.

7. In a three-block four-indication signal control arrangement for a railway signaling system in which each signal comprises a green and a yellow and also a red lamp and in which each block is equipped with traffic responsive means, the combination comprising for each of said signals, a first lightout relay energized in series with the green lamp for the corresponding signal, a second lightout relay energized in series with the yellow lamp for the corresponding signal, a home control repeater relay, a polarized distant control relay, a pole-changer relay, a flasher control relay, control circuit means for the distant control relay controlled by said traffic responsive means and by the home control repeater relay for the next signal in advance and also by pole-changing contacts of the pole-changer relay for the next signal in advance for energizing the corresponding distant control relay by current of normal or reverse polarity according as the pole-changer relay for the next signal in advance is energized or deenergized respectively while the first block in advance of the corresponding signal is unoccupied and the home control repeater relay for the next signal in advance is energized, a first and a second control circuit for each of said home control repeater relays each controlled by a contact closed by said traffic responsive means if the first block in advance of the corresponding signal is unoccupied and the first control circuit also controlled by a front contact of the second lightout relay for the corresponding signal and the second control circuit also controlled by a back contact of the second lightout relay for the corresponding signal and by a front contact of the first lightout relay for the corresponding signal and by a front neutral and a normal polar contact of the distant control relay for the corresponding signal, a first and a second control circuit for each flasher control relay controlled by front contacts of the second lightout relay and the distant control relay for the corresponding signal and by reverse and normal polar contacts respectively of the distant control relay for the corresponding signal and said second control circuit also controlled by a back contact of the first lightout relay for the corresponding signal, a first and a second control circuit for each pole-changer relay controlled by the flasher control relay for the corresponding signal in its deenergized and energized condition respectively and the first control circuit also controlled by front contacts of the first lightout relay and the distant control relay for the corresponding signal and by a normal polar contact of the distant control relay for the corresponding signal and the second control circuit also controlled by a front contact of the home control repeater relay for the corresponding signal, and means controlled by said traffic responsive means and by the distant control relay for each signal for controlling the corresponding signal to display an aspect comprising a steady green light or a flashing yellow light or a steady yellow light or a steady red light according as the first three blocks in advance of the signal are unoccupied or the first two blocks in advance are unoccupied while the third block is occupied or the first block in advance is unoccupied while the second block in advance is occupied or the first block in advance is occupied respectively.

8. In a three-block four-indication signal control arrangement for a railway signaling system in which each signal comprises a green and a yellow and also a red lamp and in which each block is equipped with traffic responsive means, and also in which each signal is controlled by said traffic responsive means to display an aspect comprising a steady green light or a flashing yellow light or a steady yellow light or a steady red light according as the first three blocks in advance of the signal are unoccupied or the first two blocks in advance are unoccupied while the third block in advance is occupied or the first block in advance is unoccupied while the second block is occupied or the first block in advance of the signal is occupied respectively, the combination comprising for each signal, a flasher control relay which if energized closes and opens its front and back contacts at a predetermined frequency, means controlled by said traffic responsive means for energizing said flasher control relay if the first two blocks in advance are unoccupied while the third block in advance is occupied, and means including each flasher control relay when in operation for effecting control of the corresponding signal to display the flashing yellow light aspect and for effecting control of the next signal in the rear of the corresponding signal to display the steady green light aspect and for effecting control of the next signal in the rear of the corresponding signal to display the flashing yellow light aspect if the flasher control relay fails to operate when it should be operating.

9. In a three-block four-indication signal control arrangement for a railway signaling system in which each signal comprises a green and a yellow and also a red lamp and in which each block is equipped with traffic responsive means, and also in which each signal is controlled by said traffic responsive means to display an aspect comprising a steady green light or a flashing yellow light or a steady yellow light or a steady red light according as the first three blocks in advance of the signal are unoccupied or the first two blocks in advance are unoccupied while the third block in advance is occupied or the first block in advance is unoccupied while the second block is occupied or the first block in advance of the signal is occupied respectively, the combination comprising for each signal, a lightout relay for said yellow lamp, means including said traffic responsive means for effecting energization of said lightout relay in series with the yellow lamp if the first and second blocks in advance of the corresponding signal are unoccupied while the third block in advance is occupied or if the first block in advance of the corresponding signal is unoccupied while the second block in advance is occupied, means including said lightout relay while energized when the first two blocks in advance of the corresponding signal are unoccupied while the third block is occupied for effecting control of the next signal in the rear of the corresponding signal to display the steady green aspect, means including said lightout relay while energized when the first block in advance of the corresponding signal is unoccupied while the second block in advance is occupied for effecting control of the next signal in the rear to display the flashing yellow aspect, and means controlled by said lightout relay for effecting control of the next signal in the rear to display the steady yellow aspect if said lightout relay is deenergized when it is controlled by said traffic responsive means to be energized.

References Cited in the file of this patent

UNITED STATES PATENTS

| | | |
|---|---|---|
| 2,132,125 | Pflasterer | Oct. 4, 1938 |
| 2,146,054 | Crago | Feb. 7, 1939 |
| 2,638,536 | Tizzard | May 12, 1953 |